Patented Nov. 12, 1929

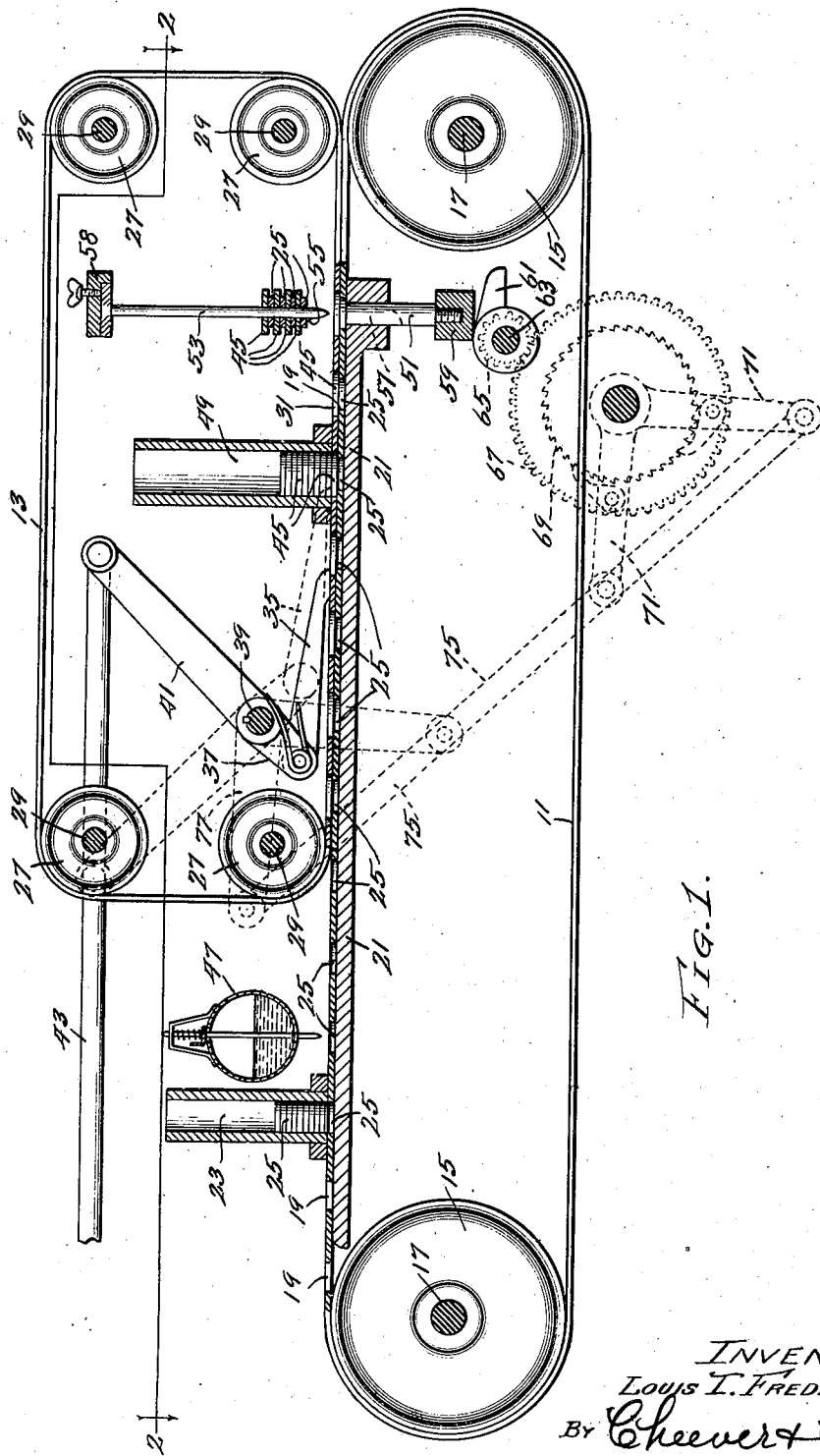

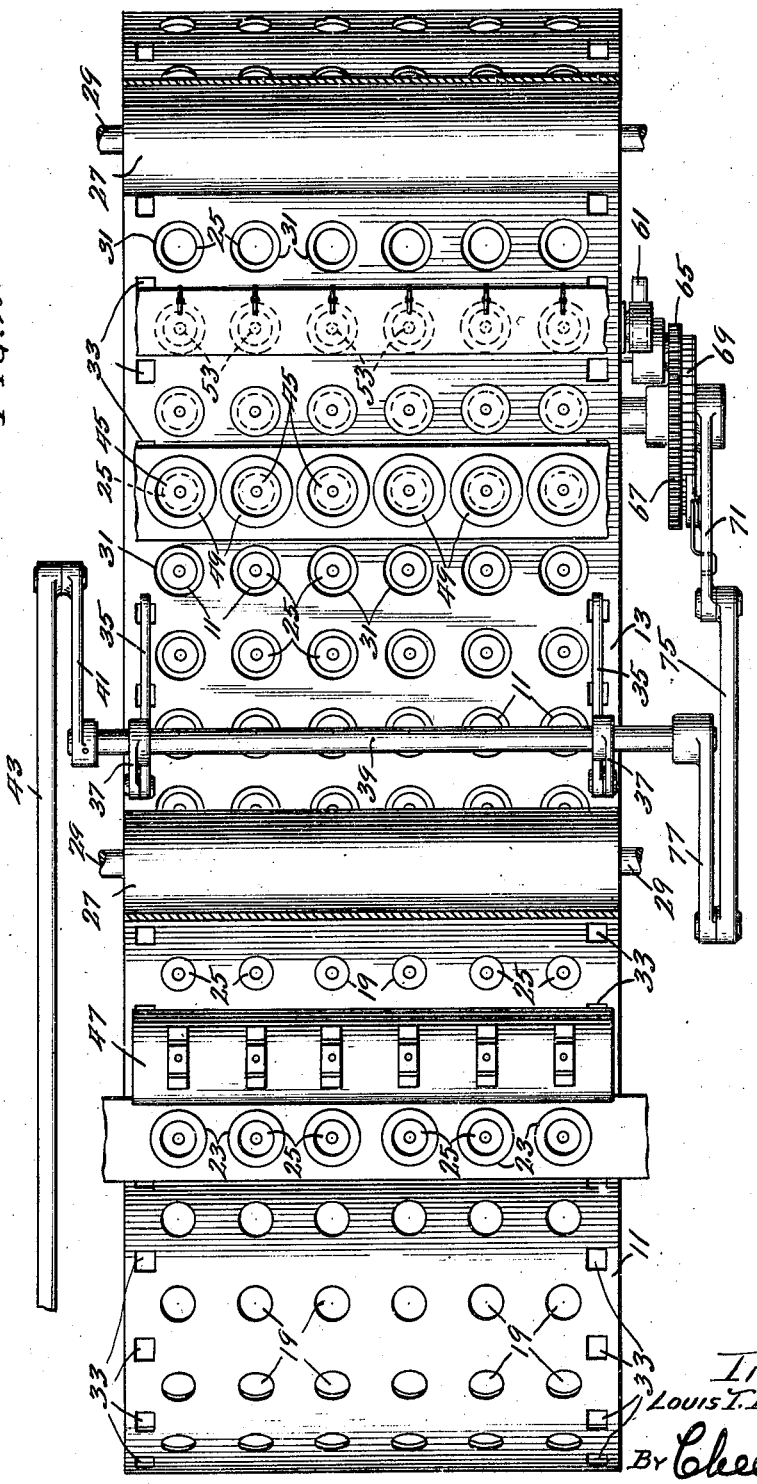

1,735,609

UNITED STATES PATENT OFFICE

LOUIS T. FREDERICK, OF VALPARAISO, INDIANA, ASSIGNOR TO CHICAGO MICA COMPANY, OF VALPARAISO, INDIANA, A CORPORATION OF INDIANA

DISK-ASSEMBLING MECHANISM

Application filed February 6, 1928. Serial No. 252,412.

My present invention relates to a method and apparatus for assembling disks in concentric adjacent relationship and while I have hereafter confined my description to a preferred embodiment in which I have applied the principles of the invention to the assembly of circular disks of unequal diameter to form laminated blanks, my invention is not limited to the assembly of disks of any particular peripheral contour but applies broadly to the assembling of any substantially flat members in contiguous alignment and in a definite sequence.

In my pending application Serial Number 247,672, filed January 18, 1928, I have shown a device for accomplishing substantially similar results and do not intend to claim in this present application anything which is specifically claimed in the aforesaid pending application.

One object of the invention is to provide a machine for assembling flat members of similar peripheral contour in stacked relationship. Another object of the invention is the provision of a machine for assembling flat members of unequal size and peripheral shape in stacked relationship.

Still another object of the invention is the provision of a machine for stacking flat members in concentric stacked relationship in which the disk carriers comprise continuously operating conveyors whereby the assembly operation may be speeded up.

A still further object of the invention is the provision of continuously operating conveyors adapted to successively position disks in alignment at an assembly point and means for removing the disks so aligned from the conveyors to a transfer means wherein the disks are received in stacked relationship.

Numerous other objects and advantages will be apparent as the invention is more fully understood from the following description, which taken in connection with the accompanying drawings discloses a preferred embodiment.

Referring to the drawings:

Figure 1 is a side elevation of an assembly device embodying my invention, parts of the device being shown in section to reveal details of construction; and Figure 2 is a horizontal section taken substantially along line 2—2 in Figure 1.

To illustrate my invention I have shown on the drawings a pair of endless belts 11 and 13. Belt 11 is carried upon spaced pulleys or rollers 15, mounted on shafts 17.

The shafts 17 are suitably supported in bearings (not shown), which may be mounted on a supporting base on frame (not shown) in any convenient manner. Belt 11 is provided with a plurality of apertures 19, which, in the embodiment illustrated, comprise circular holes through the belt. These apertures are arranged in spaced relationship throughout the length of the belt and desired number of rows of spaced apertures may be formed in the belt as illustrated in Figure 2 of the drawings. The upper stretch of belt 11 passes across the surface of a table 21 arranged between the rollers 17 and supported in any convenient manner from the supporting base. A plurality of disk containing magazines 23 are arranged above the belt in position to discharge disks 25 into the apertures of the belt as they pass beneath the discharge ends of the magazines, a magazine being provided for each row of apertures in the belt.

Although I have illustrated the apertures and disks as having a circular peripheral conformation and magazines adapted to contain a stack of circular disks, it should be understood that the disks 25 may have any desired peripheral shape, the magazines and apertures having a corresponding outline.

The belt 13 is carried by rollers 27 mounted on shafts 29 suitably journaled in bearings (not shown) which in turn are suitably supported in the base in which the elements of my device may be arranged. The rollers 27 are so arranged that the belt 13 passes in contiguous relationship to the belt 11 during a portion of the latter's movement across the table 21. The belt 13 is also provided with apertures 31, which in the illustrated embodiment, comprise circular holes through the belt, but which may be of any desired outline, providing said outline is larger than and will enclose the outline of the apertures in the belt 11 when superposed thereon. The apertures 31 are arranged in spaced relationship and in rows in the belt 13 in a manner similar to the arrangement of the apertures 19 in the belt 11. Both belts 11 and 13 are provided along their edges with a spaced series of driving notches 33 comprising apertures formed through the belts. When the driving apertures of the belts are in alignment, the apertures 31 of belt 13 are superposed over the apertures 19 of the belt 11 at the points in the table 21 where the belts are in contiguous relationship. At such points the belts comprise, in effect, a laminated conveyor having compartments therein comprising the apertures 19 and 31. This laminated conveyor may be moved across the top of the table 21 by means of pawls 35, which are pivotally mounted in the ends of arms 37, which in turn are mounted upon a transverse shaft 39. The shaft 39 is pivotally mounted for angular rotation about its axis and is driven by an arm 41, suitably fastened thereto, the end of which pivotally engages a reciprocating driving rod 43. The pawls 35 are normally urged downwardly by means of a spring. The driving rod 43 may be reciprocated from a suitable source of power through any convenient mechanism. During the forward movement of the driving rod 43 the pawls 35 are retracted along the upper surface of the belt 13. During the rearward travel of the driving rod 43 the pawls move forwardly and drop into the driving notches 33 in the belts 13 and 11, the tips of the pawls being formed of sufficient length to extend through the belt 13 and engage in the driving notches of the belt 11. Further movement of the driving rod results in the movement of the belts along the top of the table 21 in a direction towards the right in Figure 1 of the drawings. This movement continues until the driving rod is fully retracted. The arms 37 and 41 are arranged so that the belt moves through a distance equal to the spacing of the apertures therein so that whenever the belts are stationary, that is to say during the retractive movement of the pawls, the belts are in the relative position illustrated in Figure 1 of the drawings. As the upper stretch of the belt 11 moves along the table top it remains for an instant beneath magazines 23 which deposit each a disk in the apertures thereunder. As the belt progresses across the table top it stops under an inker 47 of the type described in my pending application, Serial No 247,671 filed the 18th day of January, 1928 which is adapted to deposit a drop of shellac or other suitable adhesive material upon the disks in the apertures 31 while they remain stationary thereunder. Thereafter the belt 11 passes into continuous relationship beneath the belt 13, to provide the laminated conveyor effect heretofore described. The belts then pass beneath a magazine 49 containing disks 45 having a peripheral outline similar to the apertures 31 of the belt 13. As the belts pass beneath these magazines a disk is deposited in the apertures 31 of the belt 13.

It will be apparent that each compartment of the laminated conveyor will receive two disks, which are arranged therein in a definite relative position. From beneath the magazine 49, the laminated conveyor passes above a portion of the table 21 which has a series of ejector punches 51 arranged in position to move upwardly through the apertures 31 and 19 and to raise the disks together out of the apertures. The ejector punches comprise plungers, each of which is arranged in the table 21 at a point at which the row of the compartments remains stationary while the pawls 35 are being retracted, and means is provided for raising the punches during the intervals while the belts remain stationary.

The punch actuating mechanism comprises a cam 61 mounted for rotation on a shaft 63, which is driven by a pinion 65. The pinion is rotated through one revolution, whenever the pawls 35 are retracted, by means of a gear 67, which in turn is driven by a ratchet and pawl device 69, the pawl of which is mounted upon a driving arm 71 pivotally connected by means of a rod 75 with a driving arm 77 mounted on the shaft 39. The gear ratio between the pinion 65 and the gear 67 is as one is to four, so that the cam 61 rotates and raises a bar 59 each time the pawls 35 are retracted. The bar 59 carries the ejector punches 51 which are consequently raised at the proper instant to lift the disks from the compartments of the laminated conveyor. Immediately above each ejector punch a receiver pin 53 is arranged. This pin is provided with a catch 55 and the disks are threaded upon the pin by the upward movement of the ejector punch, the punch being provided with a notch 57 to permit it to embrace the pin in order to raise the disks well above the catch 55. The pins 53 are removably carried in a bracket 58 suitably supported above the belts.

Although I have for illustrative purposes shown a receiver comprising a pin engaging apertures formed in the flat members, my invention is not limited to this particular receiver, but I contemplate the provision of any suitable receiver or conveyor depending upon the shape of the flat members and the final disposition to be made thereof.

It will however be apparent from the foregoing description that the disks are arranged in the laminated conveyor in a definite relatively stacked relationship and that they are ejected from the laminated conveyor while in such stacked relationship and deposited in a receiver, which maintains the disks in stacked relationship, and conducts them from the assembly conveyor.

Having thus described my invention, what I claim as new and desire to secure by Letters Patent is:

1. In a device of the class described, conveyor means having pockets for receiving flat members, said pockets being so arranged in the conveyor that flat members deposited therein are arranged in a desired relative stacked relationship and means for ejecting said flat members from said pockets while in said stacked relationship.

2. In a device of the class described, conveyor means having pockets for receiving flat members, said pockets being so arranged in the conveyor that flat members deposited therein are arranged in a desired relative stacked relationship, means for depositing flat members in said pockets, and means for ejecting said flat members from said pockets while in said stacked relationship.

3. In a device of the class described, conveyor means having pockets for receiving flat members, said pockets being so arranged in the conveyor that flat members deposited therein are arranged in a desired relative stacked relationship, means for depositing flat members in said pockets, means for moving said conveyor from one relatively stationary position to another, and means for ejecting said flat members from said pockets while in said stacked relationship.

4. In a device of the class described, a conveyor means having pockets each adapted to receive a plurality of flat members, said pockets being so formed and arranged that the members deposited therein are arranged in a desired relative stacked relationship, means for depositing flat members in said pockets, means for moving the conveyor periodically from one relatively stationary position to another and means for ejecting said stacked disks from said pockets.

5. In a device of the class described a plurality of conveyors having contiguous paths during a portion of their travel, said conveyors having pockets therein for receiving flat members, means for moving the belts so that the pockets thereof are in a desired relative alignment while the conveyors are contiguous, means for depositing flat members in the pockets and means for ejecting the flat members from the pockets while the conveyors are contiguous.

6. In a device of the class described a plurality of conveyors having contiguous paths during a portion of their travel, said conveyors having circular apertures therein for receiving disks, means for moving the belts so that the circular apertures thereof are in a desired relative alignment while the conveyors are contiguous, means for depositing disks in the circular apertures, and means for ejecting the disks from the circular apertures while the conveyors are contiguous.

7. In a device of the class described, conveyor means having pockets for receiving flat members, said pockets being so arranged in the conveyor that flat members deposited therein are arranged in a desired relative stacked relationship, and means for ejecting said flat members onto a holder suitably arranged to receive the flat members in stacked relationship.

8. In a device of the class described, conveyor means having pockets for receiving flat members, said pockets being so arranged in the conveyor that flat members deposited therein are arranged in a desired relative stacked relationship, and means for ejecting said flat members upwardly onto a holder suitably arranged to receive the flat members in stacked relationship, said holder having means for preventing the downward movement of the members received therein.

9. In a device of the class described, conveyor means having pockets for receiving flat members, said pockets being so arranged in the conveyor that flat members deposited therein are arranged in a desired relative stacked relationship, and means for depositing flat members in the pockets, means moving said conveyor periodically and periodically operating plungers for removing the flat members from the pockets.

10. In a device of the class described, conveyor means having pockets for receiving flat members, said pockets being so arranged in the conveyor that flat members deposited therein are arranged in a desired relative stacked relationship, and means for depositing flat members in the pockets, means moving said conveyor periodically and periodically operating plungers for removing the flat members from the pockets, said plungers operating through the pockets to raise the disks from the pockets and deposit them on a receiver.

11. In a device of the class described, a laminated conveyor, each lamination having pockets formed therein in alignment with the pockets in an adjacent lamination to form a compartment in the conveyor means for depositing a flat member in the pockets of each lamination, means moving the conveyor from one relatively stationary position to another and means for removing the flat members from said compartments to suitable receiving means.

12. In a device of the class described, a laminated conveyor, each lamination having pockets formed therein in alignment with the pockets in an adjacent lamination to form a compartment in the conveyor means for depositing a flat member in the pockets of each lamination, means moving the conveyor from one relatively stationary position to another and means for removing the flat members from said compartments to suitable receiving means while the conveyor is stationary.

13. In a device of the class prescribed, a laminated conveyor, each lamination having pockets formed therein in alignment with the pockets in an adjacent lamination to form a compartment in the conveyor means for depositing a flat member in the pockets of each lamination, means moving the conveyor from one relatively stationary position to another and plunger means for ejecting the flat members in the compartments.

14. In a device of the class described, a laminated conveyor, each lamination having pockets formed therein in alignment with the pockets in an adjacent lamination to form a compartment in the conveyor means for depositing a flat member in the pockets of each lamination, means moving the conveyor from one relatively stationary position to another and plunger means for ejecting the flat members from the compartments and a holder arranged to receive the flat members so ejected.

15. In a device of the class described, a laminated conveyor, each lamination having pockets formed therein in alignment with the pockets in an adjacent lamination to form a compartment in the conveyor means for depositing a flat member in the pockets of each lamination, means moving the conveyor from one relatively stationary position to another and plunger means for ejecting the flat members from the compartments and a holder arranged to receive the flat members so ejected, said receiver comprising a member adapted to engage a portion of each flat member for the purpose of maintaining the members in relative alignment.

16. In a device of the class described, a conveyor having a pocket for receiving a disk, means for introducing a disk into said pocket, a second conveyor having a pocket for receiving a disk, means for introducing a disk into said pocket and means for moving the conveyors to align the pockets, a receiver and means for ejecting the disks in stacked relation into said receiver when the pockets are so aligned.

17. In a device of the class described, a conveyor having a pocket for receiving a disk, means for introducing a disk into said pocket, a second conveyor having a pocket for receiving a disk, means for introducing a disk into said pocket, means for moving the conveyors to align the disks in stacked relation at a discharge point and means for ejecting the disks from the conveyors at said discharge point.

18. In a device of the class described, a conveyor having a pocket for receiving a disk, means for introducing a disk into said pocket, a second conveyor having a pocket for receiving a disk, means for introducing a disk into said pocket, a holder means for moving the conveyor from one relatively stationary position to another wherein the disks are aligned in stacked relationship opposite said holder, and means for ejecting the disks from the conveyors into the holder whereby the disks may be maintained in aligned position.

In witness whereof, I have hereunto subscribed my name.

LOUIS T. FREDERICK.